US009965924B2

(12) United States Patent

Moskowitz

(10) Patent No.: US 9,965,924 B2

(45) Date of Patent: May 8, 2018

(54) METHODS, SYSTEMS, AND APPARATUS FOR PLAYING MULTI-ZONE 21

(71) Applicant: Ahmnon D. Moskowitz, Rockville, MD (US)

(72) Inventor: Ahmnon D. Moskowitz, Rockville, MD (US)

( * ) Notice: Subject to any disclaimer, the term of this patent is extended or adjusted under 35 U.S.C. 154(b) by 52 days.

(21) Appl. No.: 15/162,541

(22) Filed: May 23, 2016

(65) Prior Publication Data

US 2017/0032622 A1 Feb. 2, 2017

Related U.S. Application Data

(63) Continuation-in-part of application No. 14/332,351, filed on Jul. 15, 2014, now Pat. No. 9,898,895.

(60) Provisional application No. 62/165,870, filed on May 22, 2015, provisional application No. 61/846,608, filed on Jul. 15, 2013.

(51) Int. Cl.

*G06F 17/00* (2006.01)

*G07F 17/32* (2006.01)

(52) U.S. Cl.

CPC ...... *G07F 17/3293* (2013.01); *G07F 17/3209* (2013.01); *G07F 17/3244* (2013.01); *G07F 17/3262* (2013.01); *G07F 17/3276* (2013.01)

(58) Field of Classification Search

None

See application file for complete search history.

(56) References Cited

U.S. PATENT DOCUMENTS

| | | | |
|---|---|---|---|
| 3,796,433 | A | 3/1974 | Fraley et al. |
| 4,339,134 | A | 7/1982 | MacHeel |
| 4,380,334 | A | 4/1983 | Minkoff et al. |
| 5,154,429 | A | 10/1992 | LeVasseur |
| 5,257,789 | A | 11/1993 | Levasseur |
| 5,395,119 | A | 3/1995 | Jacob et al. |
| 5,605,334 | A | 2/1997 | McCrea, Jr. |
| 5,791,991 | A | 8/1998 | Small |
| 5,823,873 | A | 10/1998 | Moody |
| 6,581,937 | B1 | 6/2003 | Crisswell |

(Continued)

FOREIGN PATENT DOCUMENTS

WO 2004015529 A2 2/2004

OTHER PUBLICATIONS

Allen Chan, National Search Report U.S. Appl. No. 14/332,351 dated May 12, 2016.

(Continued)

*Primary Examiner* — Ronald Laneau

(74) *Attorney, Agent, or Firm* — The Roy Gross Law Firm, LLC; Roy Gross

(57) ABSTRACT

A method and system for implementing a multi-zone blackjack game, wherein a starting zone value is only zero and a game objective is to reach a numerical value in a maximum amount of zones. In the method and system, a gaming operator device receives an initial wager from a player, reveals each card to a player and receiving an input from the player regarding which zone area to place each card in, determines which zone or zones card placement is permitted, repeats the step of revealing and receiving and the step of determining until a determination is made that card placement is not permitted, and resolves the wager according to a predetermined pay scale.

18 Claims, 7 Drawing Sheets

(56) References Cited

U.S. PATENT DOCUMENTS

| | | | |
|---|---|---|---|
| 7,367,564 | B2 | 5/2008 | Latell |
| 7,758,411 | B2 | 7/2010 | Crawford, III et al. |
| 7,785,184 | B2 | 8/2010 | Jubinville et al. |
| 7,824,254 | B2 | 11/2010 | Dunaevsky et al. |
| 9,286,747 | B2 | 3/2016 | Chang |
| 9,552,701 | B2 | 1/2017 | Pececnik |
| 2002/0111205 | A1* | 8/2002 | Beavers .................. G06Q 50/34 463/12 |
| 2003/0027621 | A1 | 2/2003 | Libby |
| 2004/0015529 | A1 | 6/2004 | Tanrikulu et al. |
| 2004/0176155 | A1 | 9/2004 | Gold et al. |
| 2007/0120320 | A1 | 5/2007 | Miltenberger et al. |
| 2007/0135203 | A1 | 6/2007 | Nicely |
| 2008/0076572 | A1* | 3/2008 | Nguyen .................. G07F 17/32 463/42 |
| 2009/0121434 | A1 | 5/2009 | Baerlocher et al. |
| 2009/0295087 | A1 | 12/2009 | Kling et al. |
| 2010/0078892 | A1* | 4/2010 | Gore .................. G07F 17/3286 273/274 |
| 2010/0261515 | A1 | 10/2010 | Tobias et al. |
| 2010/0298039 | A1 | 11/2010 | Dunaevsky et al. |
| 2011/0057390 | A1 | 3/2011 | Scalisi |
| 2011/0140359 | A1 | 6/2011 | Polynice |
| 2013/0102381 | A1* | 4/2013 | Nelson .................... A63F 13/12 463/25 |
| 2016/0379443 | A1 | 12/2016 | Abbott |

OTHER PUBLICATIONS https://en.wikipedia.org/wiki/Catch_21.
https://play.google.com/store/apps/details?id=air.com.dif-ferencegames.towerof21free.
http://www.gsn.com/games/free/catch21/.

* cited by examiner

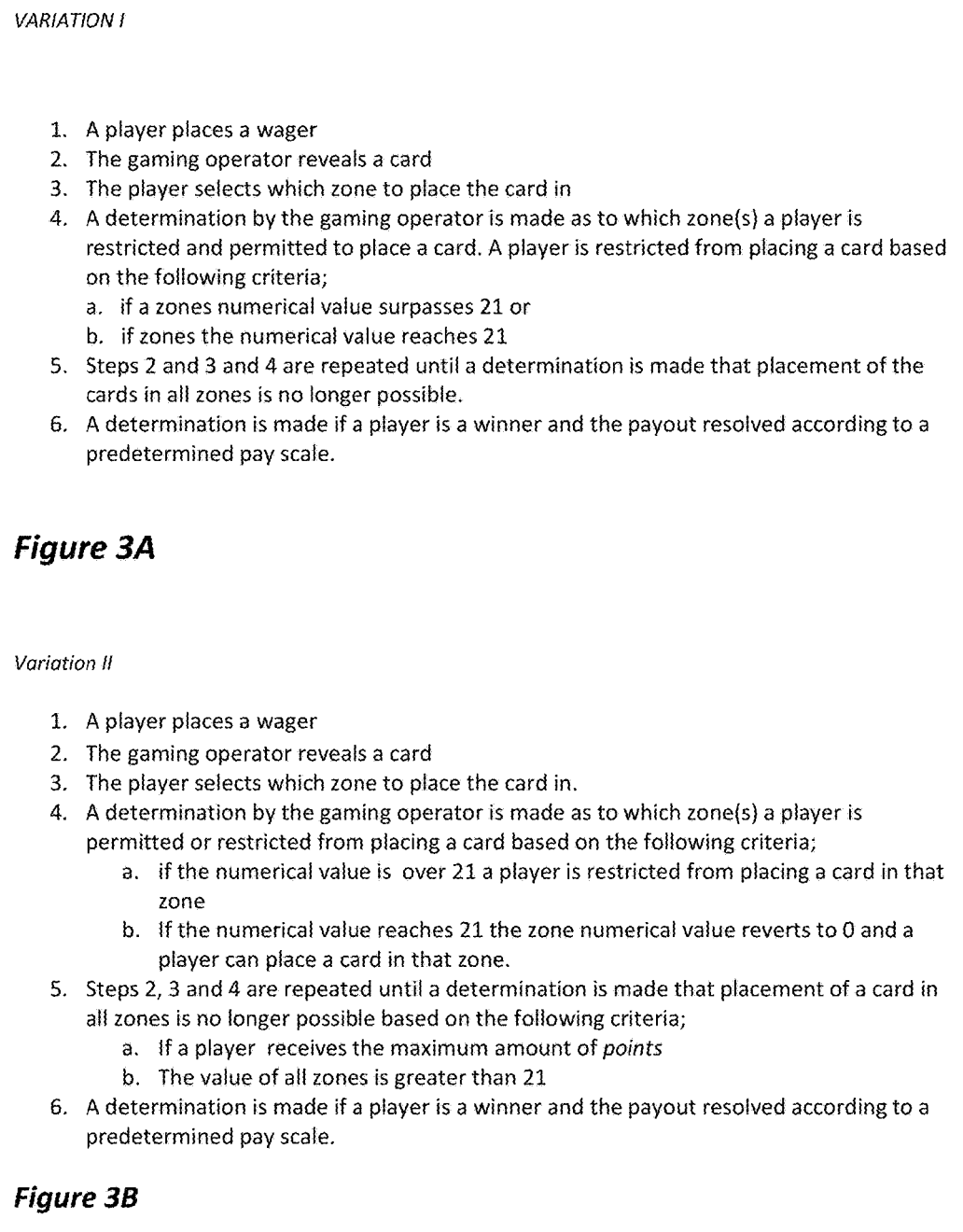

*VARIATION I*

1. A player places a wager
2. The gaming operator reveals a card
3. The player selects which zone to place the card in
4. A determination by the gaming operator is made as to which zone(s) a player is restricted and permitted to place a card. A player is restricted from placing a card based on the following criteria;
   a. if a zones numerical value surpasses 21 or
   b. if zones the numerical value reaches 21
5. Steps 2 and 3 and 4 are repeated until a determination is made that placement of the cards in all zones is no longer possible.
6. A determination is made if a player is a winner and the payout resolved according to a predetermined pay scale.

*Figure 3A*

*Variation II*

1. A player places a wager
2. The gaming operator reveals a card
3. The player selects which zone to place the card in.
4. A determination by the gaming operator is made as to which zone(s) a player is permitted or restricted from placing a card based on the following criteria;
   a. if the numerical value is over 21 a player is restricted from placing a card in that zone
   b. If the numerical value reaches 21 the zone numerical value reverts to 0 and a player can place a card in that zone.
5. Steps 2, 3 and 4 are repeated until a determination is made that placement of a card in all zones is no longer possible based on the following criteria;
   a. If a player receives the maximum amount of *points*
   b. The value of all zones is greater than 21
6. A determination is made if a player is a winner and the payout resolved according to a predetermined pay scale.

*Figure 3B*

Variation III

1. A player places a wager
2. The gaming operator reveals a card
3. The player selects which zone to place it in
4. A determination by the gaming operator is made as to which zone(s) the player is permitted or restricted from placing a card based on the following criteria;
    a. If a zone value is 21 a player is restricted from placing a card in that zone.
    b. If a zones value surpasses 21 a player is given an "out" and the value of that zone reverts to zero and the player is permitted to place a card in that zone.
5. Steps 2 and 3 and 4 are repeated until a determination is made that a player cannot place a card. The determination based on the following criteria;
    a. If a player receives the maximum amount of *points*
    b. If a player receives the maximum amount of "*outs*" (the amount of times a zones value surpasses 21).
6. A determination is made if a player is a winner and the payout is resolved according to a predetermined pay scale.

*Figure 3C*

*2 zone selection*

| | |
|---|---|
| 1 zone | $0.50 |
| 2 zones | $10.00 |
| *Double blackjack bonus* | $50 |

*3 zone selection*

| | |
|---|---|
| 2 zones | $2.00 |
| 3 zone | $30.00 |
| Triple blackjack bonus | $400 |

*4 zone selection*

| | |
|---|---|
| 2 Zones | $0.25 |
| 3 zones | $3.00 |
| 4 zone | $75.00 |
| Triple blackjack bonus | $100 |

2 Zone selections up to 4 points

| | |
|---|---|
| 1 | $0.25 |
| 2 | $5.00 |
| 3 | $20 |
| 4 | $100 |

3 zone selection with a maximum of 8 points

| | |
|---|---|
| 3 | $0.50 |
| 4 | $5.00 |
| 5 | $20.00 |
| 6 | $100.00 |
| 7 | $1,000.00 |
| 8 | $10,000 |

4 zone selection with a maximum of 12 points

| | |
|---|---|
| 3 | $0.25 |
| 4 | $0.50 |
| 5 | $1.00 |
| 6 | $2.00 |
| 7 | $5.00 |
| 8 | $20.00 |
| 9 | $100.00 |
| 10 | $500.00 |
| 11 | $2,000 |
| 12 | $10,000 |

*Figure 5B*

2 zones

| | |
|---|---|
| 1 | $0.50 |
| 2 | $3.00 |

3 zones

| | |
|---|---|
| 2 | $1.00 |
| 3 | $5.00 |

4 Zones

| | |
|---|---|
| 3 | $1.00 |
| 4 | $8.00 |

*Figure 5C*

METHODS, SYSTEMS, AND APPARATUS FOR PLAYING MULTI-ZONE 21

CROSS-REFERENCE TO RELATED APPLICATIONS

This application is a continuation-in-part Application, for which priority is claimed under 35 U.S.C. § 120, of copending U.S. patent application Ser. No. 14/332,351, filed Jul. 15, 2014, entitled "METHODS, SYSTEMS, AND APPARATUS FOR PLAYING POKER, BLACKJACK AND BACCARAT," which is a non-provisional Application, for which priority is claimed under 35 U.S.C. § 119, of U.S. Provisional Patent Application No. 61/846,608, filed Jul. 15, 2013, entitled "METHODS, SYSTEMS, AND APPARATUS FOR PLAYING POKER, BLACKJACK AND BACCARAT," and this application also is a non-provisional Application, for which priority is claimed under 35 U.S.C. § 119, of U.S. Provisional patent application No. 62/165,870, filed May 22, 2015, entitled "METHODS, SYSTEMS, AND APPARATUS FOR PLAYING MULTI-ZONE 21," the entire contents of the above identified patent applications are hereby incorporated by reference in their entirety.

FIELD OF THE INVENTION

The present invention relates to an apparatus and method of playing a variation of the card game of "21" or "Blackjack", which can be played on a table gaming apparatus or electronically through a computer readable storage.

BACKGROUND OF THE INVENTION

In blackjack generally the objective is to reach 21 or have a value that is greater than the dealer. Many blackjack games have features that allow players to win substantially higher payouts than standard blackjack like "Spanish Blackjack" or "Royal Match". A drawback to those games is that the payouts are not related to a 21 objective. The psychological focus of the player is reaching as close to 21 as possible and beating the dealer.

SUMMARY OF THE INVENTION

Applicant's related U.S. application Ser. No. 14/332,351, filed Jul. 15, 2014, directed to, for example, "Grand slam blackjack" or "Compound blackjack" addresses problems with the conventional games by allowing the opportunity for players to win substantially higher sums than normal blackjack if they reached the objective of 18-21, or 21 with a plurality of zones.

The present invention is directed to apparatus for and method of playing a game that further simplifies the features of the game described by Applicants' related U.S. application Ser. No. 14/332,351, filed Jul. 15, 2014, thereby improving and simplifying the game and an experience of a player. The present invention recognizes that in variations of "compound blackjack," for example in the related application, there are many options for the player (e.g., more options than may be desirable to a player). Hence, the present invention solves these and other problems by providing a game having less options to the players.

In an exemplary embodiment of the present invention, the player places a wager and then selects the amount of zones to start with, such as two, three or four. The starting hand for each zone can be zero (e.g., always zero). The player's objective is to reach 21 within all the selected zones. The player decides where to place the cards as they are revealed and if all the player's zones reach 21 the player is entitled to a payout.

In a second exemplary game embodiment the objective is to reach 21 a greater quantity of times than the starting zone quantity. In this example, a player places a wager, the player decides where to place the cards as the cards are dealt, and when a zone reaches 21 the player is given a point and the starting value of that zone reverts to zero, and the player continues placing cards in that zone. Gameplay is over when either 1) a player receives the maximum amount of points or 2) all the player zones bust.

In a third exemplary game embodiment, the objective is to reach 21 the maximum amount of times. The player decides where to place the cards as the cards are revealed and when a zone reaches 21 the player is given a point, if a zone busts by surpassing the numerical value of 21 the player is given an "out" and the zone value reverts to zero. The player is allowed a maximum number of busts or "outs" within a game. Gameplay is over when either 1) the player receives the maximum amount of points 2) the maximum amount of outs.

When gameplay is over in these games the wager is resolved according to a predetermined pay scale.

In another exemplary embodiment of the invention, a quantity of player starting zones can be predetermined by a gaming operator as to simplify the game for both the player and the gaming operator. In yet another example, the gaming operator can award blackjack bonuses; that is, a bonus if the player receives only a card with an ace value and a ten value in a plurality of zones.

The exemplary embodiments described herein can be played on a table apparatus or through an electronic server that uses a computer readable storage medium, or other electronic interface or input device, or the like. As a table game, the embodiments can be used in conjunction with an electronic betting interface that is connected to an apparatus that utilizes smart recognition technology to thereby improve the ease with which a gaming operator pays the winners.

Other features and advantages of the present invention will become apparent to those skilled in the art upon review of the following detailed description and drawings.

BRIEF DESCRIPTION OF THE DRAWINGS

These and other aspects and features of embodiments of the present invention will be better understood after a reading of the following detailed description, together with the attached drawings:

FIG. 3A illustrates a method of implementing a game, according to an exemplary embodiment;

FIG. 3B illustrates a method of implementing a game according to a second exemplary embodiment;

FIG. 3C illustrates a method of implementing a game according to a third exemplary embodiment;

FIG. 5B illustrates an embodiment of pay scale in accompaniment to the method illustrated in FIG. 3B; and FIG. 5C illustrates an embodiment of a pay scale in accompaniment to the method illustrated in FIG. 3C.

DETAILED DESCRIPTION OF THE EXEMPLARY EMBODIMENTS OF THE INVENTION

Figure 1:
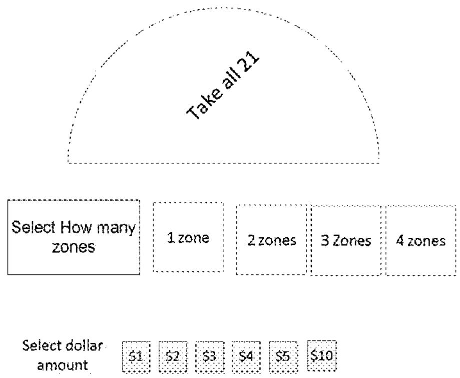
FIG. 1 illustrates an exemplary of a starting screen for a digital version of the game, according to an exemplary embodiment of the invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Referring now to the drawings, the present invention will be described with reference to the exemplary embodiments illustrated in FIGS. 1-5C.

FIG. 1 is an exemplary embodiment of the starting screen for a digital version of a game. At the top of the figure is the name of the game "Take all 21" which is another name for "Grandslam blackjack". Beneath that on the left side are the words "Select How many zones" whereby a player will decide how many zones to start with; "2 Zones", "3 zones" or "4 zones". Each zone may have (e.g., will always have) a starting value of zero and the player objective is to reach the numerical value of 21 the maximum amount of times. Beneath the zone selection there is a tab "Select dollar amount" whereby a player will select the amount of money to wager; "$1", "$2", "$3", "$4", "$5", "$10$" or "$20". This game can also be played as a table apparatus where there would be no need for a specific dollar selection, and the quantity of starting zones could be predetermined by the gaming operator.

Figure 2:
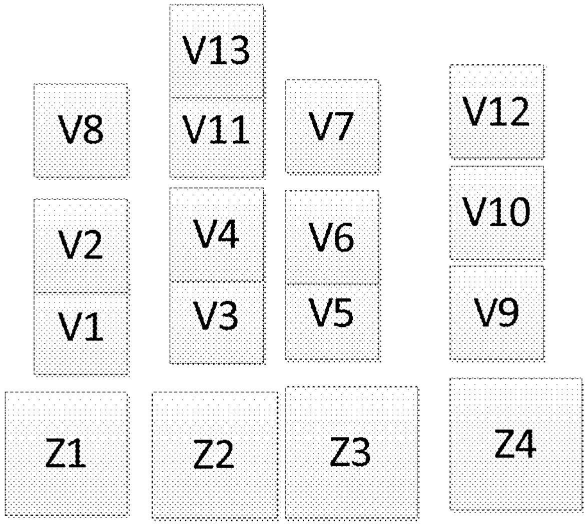
FIG. 2 illustrates an example of an illustrative game with four zones.

FIG. 2 is an exemplary embodiment of an illustrative game with four zones. The cards or variables are represented by the letter V followed by the numerical order it was drawn. The zones are represented by "Z1", "Z2", Z3", or "Z4". As each card is revealed the player chooses which zone to place the card in. In "Z1" or the first zone, the player selects to place the first, second and eighth cards; "V1", "V2" and "V8". In Z2" the second zone, the player places "V3", "V4", "V11", and "V13". In "Z3" the third zone, the player places "V5", "V6" and "V7". In Z4 the player places "V9", "V10", and "V12". One of ordinary skill in the art will appreciate that the amount of decision a player has of where to place each card, this imbues to the player the psychological feel of substantial control over the game. There are 3 rule and method variations within this exemplary embodiment of the invention.

FIG. 3A illustrates an example method of implementing a wagering game, according to an exemplary embodiment. First, a player places a wager then a dealer reveals a card and as each card is revealed the player selects which zone to place the card in. The player may be entitled to a payout for reaching 21 in all the starting zones. If a zone busts or reaches a numerical value of 21 a player is restricted from placing cards within that zone. Gameplay is over when placement of cards is not possible, and the wager is resolved according to a predetermined pay scale.

FIG. 3B illustrates a method of implementing a second exemplary embodiment. First, a player places a wager, then a dealer reveals a card and as each card is revealed the player selects which zone to place the card in. In this exemplary game, if a player reaches 21 in a zone then the player receives a point and the zone value reverts to zero, and the player can continue placing cards in that zone. The objective is to reach 21 a maximum amount of times. Gameplay is over when placement of cards in all zones is not possible. Placement is restricted when all zones bust or a player receives a maximum amount of points. The wager is resolved according to a predetermined pay scale.

FIG. 3C is method of implementing a third exemplary embodiment. First, a player places a wager, then a dealer reveals a card and as each card is revealed the player selects which zone to place the card in. In this game, if a player reaches 21 in a zone, a player receives a point and can no longer place cards in that zone. If a zone surpasses the numerical value of 21, a player gets an "out" and the value of the said zone reverts to a zero value and a player can continue placing cards in that zone. The game is over when a player receives a maximum amount of points or receives the maximum amount of "outs". The wager is resolved according to a predetermined pay scale.

In exemplary variations of FIGS. 3A, 3B and 3C, the gaming operator can allow the player to select the amount of starting zones; however, for even greater simplicity the amount of starting zones can be pre-determined by the gaming operator. In an exemplary embodiment, the game must be played with at least two zones and can be played with three, four, or more. In the embodiments illustrated in FIGS. 3B and 3C, the starting value of a zone reverts to zero; however, this can also be changed to a predetermined or random value.

The rule variations of 3B and 3C can be combined as such: the player places a wager then selects where to place each card, the value of a zone would revert to zero if 1) the zone value reaches 21 or 2) a zones numerical value surpasses 21. A player would need a maximum amount of points to win and allowed a maximum amount of busts or "outs" until the game is over. The wager would then be resolved according to a predetermined pay scale.

Figure 4A:
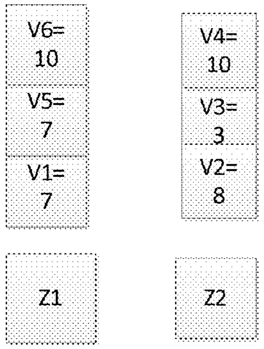
FIG. 4A illustrates an exemplary game showing a sequence of player placement of cards in accordance to the rules and method in the example illustrated in FIG. 3A and the first phase of a sequence of cards for an illustrative game according to the rules and methods in the examples illustrated in the embodiments of FIGS. 3B and 3C.

FIG. 4A illustrates an example game showing the sequence of player placement of cards in accordance to the method illustrated in the embodiment of FIG. 3A and the first phase of a sequence of cards for an illustrative game according to the method illustrated in the embodiments of FIGS. 3B and 3C.

Below the sequence number represented by "V" is the numerical value of the card. In this example game, a player places V1, V5, V6; the first, fifth and sixth cards revealed in Z1, a total numerical value of 27 (7+7+10). The player places V2, V3, and V4 with numerical value of 21 (8+3+10) in Z2. According to the rules of FIG. 3A, this game has ended and the players wager is resolved according to the predetermined pay scale in FIG. 5A and the player will receive a subordinate payout of $0.50. The game play is over according to the rules and method of FIG. 3A, however, the game continues for a game according to the embodiments of FIGS. 3B and 3C.

Figure 4B:
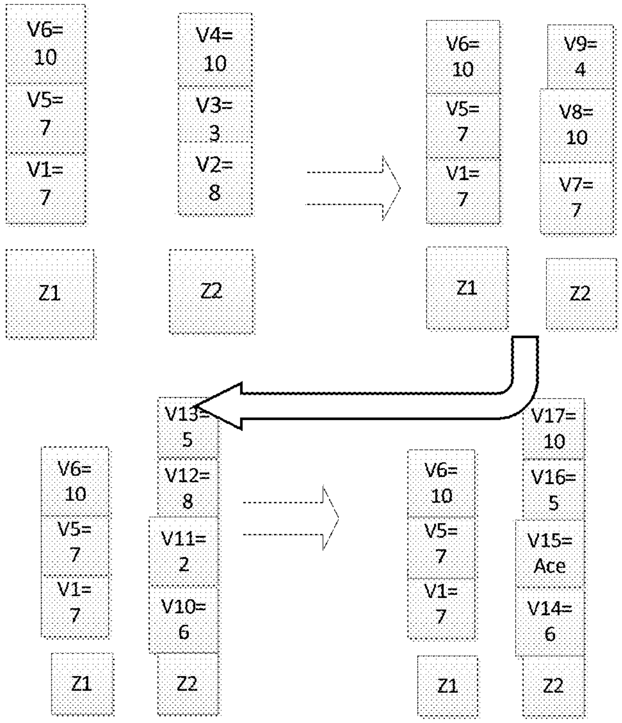
FIG. 4B illustrates an example game of the sequence and player placement of the cards in accordance to the method illustrated in FIG. 3B.

FIG. 4B illustrates an example game of the sequence and player placement of the cards in accordance to the method illustrated in FIG. 3B. On the upper left side of the diagram shows the sequence from FIG. 4A, in which a player received 21 in Z2 and busted in Z1. The objective within the rules of FIG. 3B is to reach 21 a maximum amount of times. According to the rules of FIG. 3B, since the player busted in Z1, the player is restricted from placing cards in that zone, Z2 reached 21 and a player is given a point and the zones numerical value reverts to zero and the game continues. The upper right of FIG. 4B shows the next sequence of card placements. The player places V7, V8, and V9 in Z2, with a total value of 21(10+7+4), Z2 again reverts to zero and a player is given a second point and the game continues. The lower left side of the diagram illustrates the next sequence of player placement; V10, V11, V12, and V13. Since Z2 reached 21(6+2+8+5) again the player is given a third point and the numerical value reverts again to zero. The lower right side illustrates the final placement of cards; V14, V15, V16, and V17 are placed in Z2 with a total value of 21 (6+Ace+5+10). The player receives a fourth point the maximum amount of points and the game is over and the wager is resolved with a payout of $75.00 according to the pay scale illustrated in FIG. 5B.

Figures 4C, 5A:
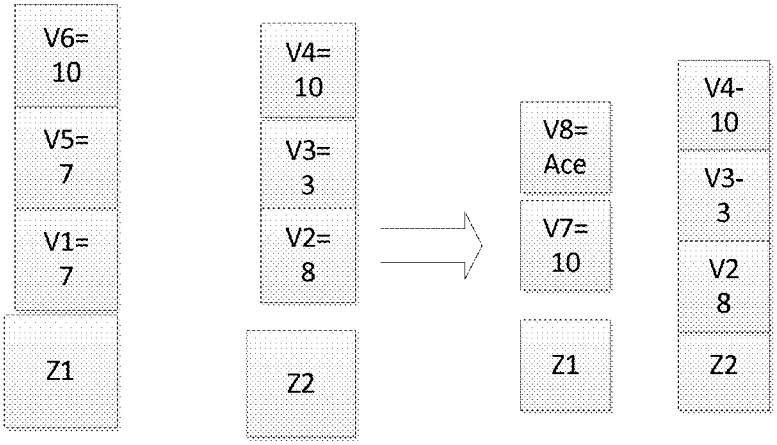
FIG. 4C illustrates an example game of the sequence of cards in accordance with the method of the embodiment illustrated in FIG. 3C.
FIG. 5A illustrates an embodiment of a pay scale in accompaniment to the method illustrated in FIG. 3A.

FIG. 4C illustrates an example diagram of the sequence of cards in in accordance to the method of the embodiment illustrated in FIG. 3C. The left hand side shows an initial sequence from FIG. 4A in which Z1 busted and Z2 reached 21. In accordance with the rules of FIG. 3C, a player is given a point and an "out". The numerical value of Z1 reverts to zero and card placement is allowed within that zone, V7 and V8 are dealt with an Ace and ten values, the player receives a second point, the maximum amount. The wager is resolved according to a predetermined pay scale which is $5.00 according to FIG. 5C.

FIG. 5A illustrates an example of a pay scale in accompaniment to the method illustrated in FIG. 3B. In this exemplary game, the amount of zones a player can win is limited by the zone starting quantity. On the left of the pay scale are the points or zones a player needs to win and on the right is the payout a player is entitled to for reaching those points.

Although the odds in the illustrated pay scales may not be optimal for a player or casino operator, one of ordinary skill in the art will appreciate that incremental increases may be awarded to a player as the player wins more points. There can also be a bonus if a player receives a plurality of blackjack values. For purposes of this example, a blackjack value is defined as a single zone that contains only an ace and a ten value. For simplicity, a gaming operator might prefer to do away with such a bonus or the gaming operator may place a different bonus known within the blackjack art.

FIG. 5B is an embodiment of a pay scale in accompaniment to the method of FIG. 3B.

One of ordinary skill in the art will appreciate the differences between the payouts of FIGS. 5B and 5A in that a player can reach 21 a greater quantity of times. This would be particularly advantageous in online wagering with the advantage that it extends the amount of game time for the player.

FIG. 5C illustrates an example of a pay scale in accompaniment to the method illustrated in FIG. 3C. In this example, the payouts are less since a player has an opportunity to bust; that is, go over the numerical value of 21 in a zone. This opportunity can either be included within the game or a gaming operator can request an additional fee from the player. This example game has the appeal to players of having better odds than the method illustrated in FIG. 5A.

An exemplary embodiment is directed to a method of playing a multi-zone blackjack game wherein the starting zone value is only zero and there is an objective to reach a numerical value in the maximum amount of zones. The method can include the following steps: a) a player making and initial wager; b) as each card is revealed to a player the player determines which zone area to place the card in; c) the gaming operator determines which zone(s) card placement is permitted; d) steps b and c are repeated until a determination is made that card placement is not permitted; e) the wager is determined or resolved according to a predetermined pay scale (which may be stored electronically, for example on a recordable medium, etc.). The amount of times required for a top payout can be the same as the quantity of starting zones. The game can end when a determination is made that all zones reached a numerical value of more than 21 or exactly 21. If a determination is made that a zone reaches 21, then a player can be given a point and the value of the said zone reverts to zero and placement of cards within that zone can continue. If a determination is made that if a zone value surpasses 21, then a player can be given an out and the value of that zone reverts to a zero value and placement of a card is possible within that zone. The number of outs can be limited. In other embodiments, the rules of the exemplary games can be combined. The game can include a subordinate payout if the player reaches 21 in at least one zone. The game can include a bonus payout if a determination is made that a player received exactly an ace value and a ten value in a plurality of zones. The bonus payout can be higher than the top payout for a 21 objective. The quantity of starting zones can be predetermined by a gaming operator.

A method and system of implementing a wagering game of 21 with a plurality of zones wherein each zone has a starting value of zero. Whereby the gaming operator reveals a card and the player selects which zone to place it in. If the player's choice leads to the maximum amount of zones reaching 21 a payout is awarded. In one exemplary embodiment the player is entitled to a payout if all the starting zones reach 21. In a second exemplary embodiment the player objective is to reach 21 a predetermined amount of times and if a zone reaches 21 the zone reverts to a zero value and the player can continue to place cards within that zone. In a third exemplary embodiment the player objective is to reach 21 a predetermined amount of times and if a zone busts the player is given an "out" and the said zone value reverts to zero and the player can continue to place cards within that zone, the player is allowed a limited amount of "outs". When placement of cards is restricted in these games gameplay ends and the wager is resolved according to a predetermined pay scale.

An exemplary embodiment is directed to a method to play a multi-zone blackjack game wherein the starting zone value is only zero and there is an objective to reach a numerical value in the maximum amount of zones. The method comprises the following steps: a) a player making and initial wager; b) as each card is revealed to a player the player determines which zone area to place the card in; c) the gaming operator determines which zone(s) card placement is permitted; d) steps b and c are repeated until a determination is made that card placement is not permitted; and e) resolving the wager according to a predetermined pay scale.

In an embodiment, the amount of times required for a top payout is the same as the quantity of starting zones. In an embodiment, the game ends when a determination is made that all zones reached a numerical value of more than 21 or exactly 21. In an embodiment, if a determination is made that a zone reaches 21 a player is given a point and the value of the said zone reverts to zero and placement of cards within that zone can continue. In an embodiment, if a determination is made that if a zone value surpasses 21 a player is given an out and the value of that zone reverts to a zero value and placement of a card is possible within that zone. In an embodiment, number of outs is limited. In an embodiment, rules of game can be combined including wherein if a determination is made that a zone reaches 21 a player is given a point and the value of the said zone reverts to zero and placement of cards within that zone can continue, and wherein if a determination is made that if a zone value surpasses 21 a player is given an out and the value of that zone reverts to a zero value and placement of a card is possible within that zone. In an embodiment, there is a subordinate payout if the player reaches 21 in at least one zone. In an embodiment, there is a bonus payout if a determination is made that a player received exactly an ace value and a ten value in a plurality of zones. In an embodiment, the bonus payout can be higher than the top payout for a 21 objective. In an embodiment, the quantity of starting zones is predetermined by the gaming operator.

Another embodiment is directed to a method to play a multi-zone blackjack game wherein the starting zone value is only zero and there is an objective to reach a numerical value in the maximum amount of zones, the method comprising the following steps: a) A player making and initial wager; b) The gaming operator determines which zone(s) card placement is permitted; c) Steps b and c are repeated until a determination is made that card placement is not permitted; and d) Resolving the wager according to a predetermined pay scale. In an embodiment, the top payout is for reaching the said numerical value in a plurality of zones is at least ten times the value of the minimum payout.

To summarize, a method and system of implementing a wagering game of 21 with a plurality of zones is provided, wherein each zone has a starting value of zero, whereby the gaming operator reveals a card and the player selects which zone to place it in. If the player's choice leads to the maximum amount of zones reaching 21, a payout is awarded. In one exemplary embodiment the player is entitled to a payout if all the starting zones reach 21. In a second exemplary embodiment the player objective is to reach 21 a predetermined amount of times and if a zone reaches 21 the zone reverts to a zero value and the player can continue to place cards within that zone. In a third exemplary embodiment the player objective is to reach 21 a predetermined amount of times and if a zone busts the player is given an "out" and the said zone value reverts to zero and the player can continue to place cards within that zone, the player is allowed a limited amount of "outs". When placement of cards is restricted in these games gameplay ends and the wager is resolved according to a predetermined pay scale.

The present invention has been described herein in terms of several preferred embodiments. However, modifications and additions to these embodiments will become apparent to those of ordinary skill in the art upon a reading of the foregoing description. It is intended that all such modifications and additions comprise a part of the present invention to the extent that they fall within the scope of the several claims appended hereto.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a terminal. In the alternative, the processor and the storage medium may reside as discrete components in a terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

I claim:

1. A method of playing a multi-zone blackjack game on an electronic gaming device, the method comprising:

providing an electronic gaming device having a wager input device that accepts vouchers and physical currency, a processor, and a controller, wherein the controller controls an electronic game of multi-zone blackjack, wherein the electronic game of multi-zone blackjack includes at least two zones;

initiating the game via the processor on the electronic gaming device, the game involving:

a) receiving via the processor, an initial wager from a player;

b) revealing, by the electronic gaming device, a blackjack card to a player;

c) receiving an input from the player regarding which zone area to place the blackjack card in;

d) repeating, by the electronic gaming device, steps (b)-(c) until the total value of the cards in each of the two or more zones is twenty-one (21) or greater than twenty-one (21); and e) determining via the processor whether the player is entitled to a payout if the player achieves a value of twenty-one (21) in at least one of the two or more zones.

2. The method as recited in claim 1, wherein an amount of times required for a maximum payout is equal to a quantity of starting zones.

3. The method as recited in claim 2, wherein the game ends when a determination is made, by the electronic gaming device, that all zones reached a numerical value of more than twenty-one (21) or exactly twenty-one (21).

4. The method as recited in claim 1, wherein, if a determination is made by the electronic gaming device that a zone reaches twenty-one (21), the electronic gaming device gives a player a point and a value of the zone reverts to zero and placement of cards within that zone can continue.

5. The method as recited in claim 1, wherein, if a determination is made by the electronic gaming device that if a zone value surpasses twenty-one (21), the electronic gaming device gives a player an out and a value of that zone reverts to a zero value and placement of a card is possible within that zone.

6. The method of playing a game as recited in claim 5, wherein a number of outs is limited.

7. The method of playing a game as recited in claim 1, wherein, if a determination is made by the electronic gaming device that a zone reaches twenty-one (21), the electronic gaming device gives a player a point and a value of the zone reverts to zero and placement of cards within that zone can continue, and wherein, if a determination is made by the electronic gaming device that if a zone value surpasses twenty-one (21), the electronic gaming device gives a player an out and a value of that zone reverts to a zero value and placement of a card is possible within that zone.

8. The method of playing a game as recited in claim 1, wherein the electronic gaming device provides a subordinate payout if the player reaches twenty-one (21) in at least one zone.

9. The method of playing a game as recited in claim 1, wherein the electronic gaming device provides a bonus payout if a determination is made by the electronic gaming device that a player received exactly an ace value and a ten value in a plurality of zones.

10. The method as recited in claim 9, where the bonus payout is higher than the maximum payout for a twenty-one (21) objective.

11. The method as recited in claim 1, wherein the quantity of starting zones is predetermined by the electronic gaming device.

12. The method as recited in claim 1, wherein the starting zone value of each of the at least two zones is zero.

13. A method of playing a multi-zone blackjack game on an electronic gaming device, the method comprising:

providing an electronic gaming device having a wager input device that accepts vouchers and physical currency, a processor, and a controller, wherein the controller controls an electronic game of multi-zone blackjack, wherein the electronic game of multi-zone blackjack includes at least two zones;

initiating the game via the processor on the electronic gaming device, the game involving:

a) receiving via the processor, an initial wager by a player;

b) receiving an input from the player regarding which zone area to place the blackjack card in;

c) repeating, by the electronic gaming device, the step of receiving an input until the total value of the cards in each of the two or more zones is twenty-one (21) or greater than twenty-one (21); and d) determining via the processor whether the player is entitled to a payout if the player achieves a value of twenty-one (21) in at least one of the two or more zones.

14. The method of claim 13, wherein a maximum payout for reaching the numerical value in a plurality of zones is at least ten times a value of a minimum payout.

15. The method as recited in claim 13, wherein the starting zone value of each of the at least two zones is zero.

16. A system for playing a multi-zone blackjack game, the system comprising:

an electronic gaming device comprising:

an input device configured to receive an input from a player; and a controller programmed to control the game, wherein the electronic gaming device is configured to:

(a) receive an initial wager from a player;

(b) reveal each card to the player;

(c) receive an input from the player regarding which zone area to place the blackjack card in;

(d) repeat steps (b)-(c) until the total value of the cards in each of the two or more zones is twenty-one (21) or greater than twenty-one (21); and (e) determining via the processor whether the player is entitled to a payout if the player achieves a value of twenty-one (21) in at least one of the two or more zones.

17. The system of claim 16, further comprising a structured paytable, wherein the payout is determined via the structured paytable.

18. The system of claim 17, wherein the paytable is cumulatively added.

* * * * *